(12) United States Patent
Yukawa et al.

(10) Patent No.: US 8,072,340 B2
(45) Date of Patent: Dec. 6, 2011

(54) WATER LEAKAGE MONITORING SYSTEM

(75) Inventors: Atsushi Yukawa, Tokyo (JP); Katsuya Yokokawa, Fuchu (JP); Naoto Oishi, Kitakyushu (JP)

(73) Assignees: Kabushiki Kaisha Toshiba, Tokyo (JP); City Of Kitakyushu, Fukuoka (JP)

( * ) Notice: Subject to any disclaimer, the term of this patent is extended or adjusted under 35 U.S.C. 154(b) by 546 days.

(21) Appl. No.: 12/266,025

(22) Filed: Nov. 6, 2008

(65) Prior Publication Data

US 2009/0066524 A1    Mar. 12, 2009

Related U.S. Application Data

(63) Continuation of application No. PCT/JP2007/066737, filed on Aug. 29, 2007.

(30) Foreign Application Priority Data

Sep. 7, 2006   (JP) .................................. 2006-243143

(51) Int. Cl.
*G08B 21/00* (2006.01)
*G01F 13/00* (2006.01)
*G01M 3/04* (2006.01)

(52) U.S. Cl. ........ 340/605; 340/606; 340/611; 340/618; 340/626; 702/51; 73/40

(58) Field of Classification Search .................. None
See application file for complete search history.

(56) References Cited

U.S. PATENT DOCUMENTS

| 4,852,054 | A | * | 7/1989 | Mastandrea | ..................... 702/51 |
| 5,920,265 | A | * | 7/1999 | Johnson et al. | ............... 340/605 |
| 6,317,051 | B1 | * | 11/2001 | Cohen | ............................ 340/603 |
| 2006/0191323 | A1 | * | 8/2006 | Garabedian et al. | .............. 73/40 |

FOREIGN PATENT DOCUMENTS

| JP | 58-120143 | 7/1983 |
| JP | 2000-131179 | 5/2000 |
| JP | 2001-311676 | 11/2001 |
| JP | 2002-228538 | 8/2002 |
| JP | 2004-191139 | 7/2004 |
| JP | 2005-114583 | 4/2005 |

OTHER PUBLICATIONS

International Preliminary Report on Patentability and Written Opinion issued by the International Bureau of WIPO on Mar. 26, 2006, for International Patent Application No. PCT/JP2007/066737. Tamai, "Doboku Kogaku Kiso Series 5-2 Hydraulics," Baifukan (1989), pp. 150-152.

International Search Report from the European Patent Office, for International Application No. PCT/JP2007/066737, filed Aug. 29, 2007.

* cited by examiner

*Primary Examiner* — Julie Lieu
(74) *Attorney, Agent, or Firm* — Finnegan, Henderson, Farabow, Garrett & Dunner, L.L.P.

(57) ABSTRACT

A water leakage monitoring system including a water leakage position estimator which includes a periodic data acquiring unit for fetching predetermined-period flow rate pressure data stored in a monitoring device, and for fetching a signal related to a flow rate change and pressure changes expecting a water leakage reaction time calculating unit for calculating a pressure reaction time lag between two pressure changes, a pressure propagation velocity estimating unit for estimating a pressure propagation velocity using the pressure reaction time lag and a distance between two pressure gauges located in a water distribution block stored in a pipeline network map data, and a flow rate change position estimating unit for receiving a signal related to the flow rate change, and estimating a flow rate change position using pressure propagation velocity and a flow meter and pressure gauge locating positions of the pipeline network map data.

6 Claims, 10 Drawing Sheets

F I G. 1

| Time (second) | Measurement target | 100M | 100P1 | 100P2 | 101M | 101P1 | 101P2 |
|---|---|---|---|---|---|---|---|
| 00:01 | | xxx | xxx | xxx | xxx | xxx | xxx |
| 00:02 | | xxx | xxx | xxx | xxx | xxx | xxx |
| 00:03 | | | | | | | |
| 00:04 | | | | | | | |
| 00:05 | | | | | | | |
| 00:06 | | | | | | | |
| 00:07 | | | | | | | |
| 00:08 | | | | | | | |
| 00:09 | | | | | | | |

| Kind of pipeline (bore) | Inflow pressure | Water leakage factors | Flow rate change value |
|---|---|---|---|
| 100mmφ | ××× | Crack small | ××× |
| | | Crack intermediate | ××× |
| | | Crack large | ××× |
| | ××× | Crack small | ××× |
| | | Crack intermediate | ××× |
| | | Crack large | ××× |
| 200mmφ | ××× | | |
| | | | |
| | | | |
| Fire hydrant | ××× | ××× | |
| Water receiving tank | ××× | ××× | |

WATER LEAKAGE MONITORING SYSTEM

CROSS-REFERENCE TO RELATED APPLICATIONS

This is a Continuation Application of PCT Application No. PCT/JP2007/066737, filed Aug. 29, 2007, which was published under PCT Article 21(2) in Japanese.

This application is based upon and claims the benefit of priority from prior Japanese Patent Application No. 2006-243143, filed Sep. 7, 2006, the entire contents of which are incorporated herein by reference.

BACKGROUND OF THE INVENTION

1. Field of the Invention

The present invention relates to a water leakage monitoring system, which estimates leakage positions in water distribution blocks forming a water distribution pipeline network.

2. Description of the Related Art

Water purified by a public water treatment plant is supplied to a large number of customers spread over a large-area district via a water distribution pipeline network. Therefore, the water distribution pipeline network functions as an essential lifeline network to maintain customers' daily life. Thus, the distribution pipeline network has a need to constantly meet water demands for customers based on high reliability. If a breakage occurs in a part of a water distribution pipeline forming each water distribution block, the following problems arise. Namely, this is a factor of causing a disaster such as cave-in and submergence in the road. In addition, water leakage by crack and breakage of the pipeline is a factor of decreasing effective water (efficiency) with respect to the total distributed water. For this reason, it is desired to rapidly detect crack and breakage portions of the pipeline in addition to a decrease of a wall thickness of the pipeline as much as possible.

There is a conventional water leakage detection method generally employed. According to the method, a flow rate to each water distribution block is checked for a long term, and then, leakage is detected from a change of the flow rate. For example, the minimum nighttime flow rate of each water distribution block is measured at a nighttime zone when customers do not almost use water. Thereafter, a flow rate of the same time zone is checked. If there is a tendency for the flow rate to increase, it is determined that water leaks from any distribution pipeline forming the water distribution block.

When it is determined that water leaks, a workman must do the following work by using a water leakage detector. Specifically, the workman moves along a complex distribution pipeline including service pipe of customers in the water distribution block. The workman further detects an inflow sound using the water leakage detector at time zone when the water is not used, and thereby, estimates a water leakage portion of the pipeline.

Therefore, according to the foregoing water leakage detection method, the nighttime minimum inflow rate must be collected for a long period. For this reason, even if water now leaks from a certain portion in the distribution block, it may not be determined that water leaks so long as verification is made for a long time. As a result, a small crack of the water distribution pipeline is gradually made large as time elapses. Finally, the pipeline is broken; as a result, there is a possibility of causing a disaster such as cave-in and submergence in the road.

According to the foregoing conventional water leakage detection method, the following problem further arises. Specifically, even if it is determined that water leaks in a certain distribution block, it is impossible to estimate that water leaks from any distribution pipeline in the distribution block. As a result, a workman moves along the distribution pipelines forming the distribution block, and simultaneously, must strictly collect an inflow sound of the pipeline using the water leakage detector. Thus, this is a factor of increasing a workman's load, and effective water will be lost for a long term.

In recent years, some water leakage detection techniques have been proposed.

According to one conventional water leakage detection technique, an opening/closing lid of a water meter located on a service pipe led to customers from the distribution pipeline is provided with a sound detector. A specific sound detected by the detector from a body of the water meter is used to determine an occurrence of water leakage in the service pipe and to output the determined signal outside. (See FIG. 1 of Jpn. Pat. Appln. KOKAI Publication No. 2004-191139)

According to another conventional water leakage detection technique, the service pipe of customers led from the distribution pipeline is provided with a vibration detector and data storage means. The vibration detector measures a vibration level of a pipe caused by water stream flowing through the service pipe. The data storage means stores flow rate measurement data of water flow meter of the customer and the measured data from the vibration detector. Using the foregoing vibration detector and storage means, water leakage is detected from the vibration when water flows. (See FIG. 1 of Jpn. Pat. Appln. KOKAI Publication No. 2001-311676)

BRIEF SUMMARY OF THE INVENTION

According to the foregoing two conventional water leakage detection techniques, the service pipe of each customer led from the distribution pipeline is provided with sound or vibration detection means. Thus, this is a technique of determining water leakage of the service pipe of each customer. Therefore, it is impossible to comprehensively determine a leakage state in many distribution blocks connected to a main trunk line of public water.

According to the foregoing two conventional water leakage detection techniques, the following problem further arises. A comparison should be made between the sound or vibration level measured by the detection means and the flow rate measurement data of the water flow meter for every predetermined period. This is a technique of merely determine water leakage in the vicinity of the service pipe of each customer. For this reason, even if water leaks due to a crack of the pipeline, it is impossible to instantly determine a leakage until a predetermined time period elapses. In addition, only individual water leakage at the service pipe can be determined for every customer.

The present invention has been made in view of the foregoing circumstances. An object of the invention is to provide a water leakage monitoring system, which can speedy and easily estimate a water leakage position from measurement data obtained from measurement apparatuses provided in each of a plurality of distribution blocks forming a water distribution pipeline network.

In order to solve the foregoing problem, according to one aspect of the present invention, there is provided a water leakage monitoring system comprising:

a monitoring device receiving periodically flow rate data and pressure data measured by a flow meter and pressure gauges located in each water distribution block in a water distribution pipeline network, and storing successively the periodically received flow rate data and pressure data in a time-series manner at each water distribution block; and a water leakage position estimation device estimating a water leakage position from the flow rate data and the pressure data stored in the monitoring device, wherein the water leakage position estimation device includes:

periodic data acquiring means for fetching periodically from the monitoring device the flow rate data and the pressure data of every water distribution block to output a signal relating to a flow rate change expecting a water leakage from the flow rate data and another signal relating to pressure changes caused by the flow rate change, the pressure changes being denoted by two items of periodic pressure data obtained from at least two pressure gauges;

pressure gauge reaction time calculating means for calculating a time difference between two pressure changes obtained from the two pressure gauges from the periodic data acquiring means;

pressure propagation velocity estimating means for estimating a pressure propagation velocity using the time difference between the pressure gauge reaction times obtained by the pressure gauge reaction time calculating means and a distance between two pressure gauge positions in each water distribution block previously included in a water distribution pipeline network map data; and flow rate change position estimating means for estimating and displaying a flow rate change position denoting a water leakage position using the pressure propagation velocity estimated by the pressure propagation velocity estimating means and flow meter and pressure gauge positions data included in the water distribution pipeline network map data when receiving the signal relating to the flow rate change from the periodic data acquiring means.

According to further aspect of the present invention, the water leakage monitoring system further includes storage means for storing data denoting a relation between at least the flow rate change and pipe diameter, and pipe diameter specifying means for referring to the storage means based on the flow rate change when receiving a signal relating to the flow rate change obtained by the periodic data acquiring means, and specifying a pipe diameter of a pipeline having the flow rate change, and further, sending the specified pipe diameter data to the flow rate change position estimating means to output and display the specified pipe diameter data together with flow rate change position data.

The water leakage monitoring system according to another aspect of the present invention further comprises, in addition to the foregoing storage means and pipe bore specifying means: storage means for storing data denoting a relation between at least the flow rate change and various flow rate change factors including crack or breakage of a pipeline located in each of the water distribution block; and flow rate change factor acquiring means for referring to the storage means based on the flow rate change when receiving a signal relating to the flow rate change obtained by the periodic data acquiring means for estimating and displaying the flow rate change factor data denoting that the flow rate change results from one of the crack or breakage of the pipeline, use of a fire hydrant and an operation of a water receiving tank.

According to further aspect of the present invention, there is provided a water leakage monitoring system including a water leakage position estimator which comprises: periodic data acquiring means for fetching periodically from the monitoring device flow rate data and pressure data of every water distribution block to output a signal relating to a flow rate change expecting a water leakage from the flow rate data and further relating to pressure changes caused by the flow rate change, the pressure changes being denoted by two items of periodic pressure data obtained from at least two pressure gauges; pressure gauge reaction time calculating means for calculating a pressure reaction time difference from a signal relating to a change between two pressures output from the period data acquiring means; pressure propagation velocity estimating means for estimating a pressure propagation velocity using the pressure reaction time difference obtained by the pressure gauge reaction time calculating means and a distance between two pressure gauges obtained two pressure gauge positions in each water distribution block previously included in a water distribution pipeline network map data; pipe diameter calculation means for obtaining diameters of pipes mutually connecting the pressure gauges of the water distribution block or connecting the flow meter and the pressure gauge from previously stored water distribution pipeline network map data when receiving a signal relating to the flow rate change from the periodically data acquiring means, and calculating an average pipe diameter when a connection is made using a pipeline having a pipe diameter different from the fetched pipe diameter; and pipeline wall thickness estimating means for estimating and displaying a wall thickness of a pipeline having the flow rate change based on a predetermined pressure propagation velocity calculating equation using the pipe diameter obtained by the pipe diameter calculation means and the pressure propagation velocity.

A comparison is made between the pressure propagation velocity estimated by the pressure propagation estimating means and a pressure propagation velocity obtained from the predetermined propagation velocity calculating equation using a wall thickness and diameter of the pipeline having a flow rate change obtained from the water distribution pipeline network map data, and the pipeline data having a flow rate change is output and displayed when a large difference exists between the foregoing two pressure propagation velocities.

According to the present invention, there is provided a water leakage monitoring system, which can speedy and easily estimate a water leakage position from a flow rate change of measured data by a flow meter and two pressure gauges located in a water distribution block forming a water distribution pipeline network and a pressure change changing resulting from the flow rate change.

DETAILED DESCRIPTION OF THE INVENTION

The basic configuration of a water leakage monitoring system according to the present invention will be hereinafter described with reference to the accompanying drawings.

Figure 1:
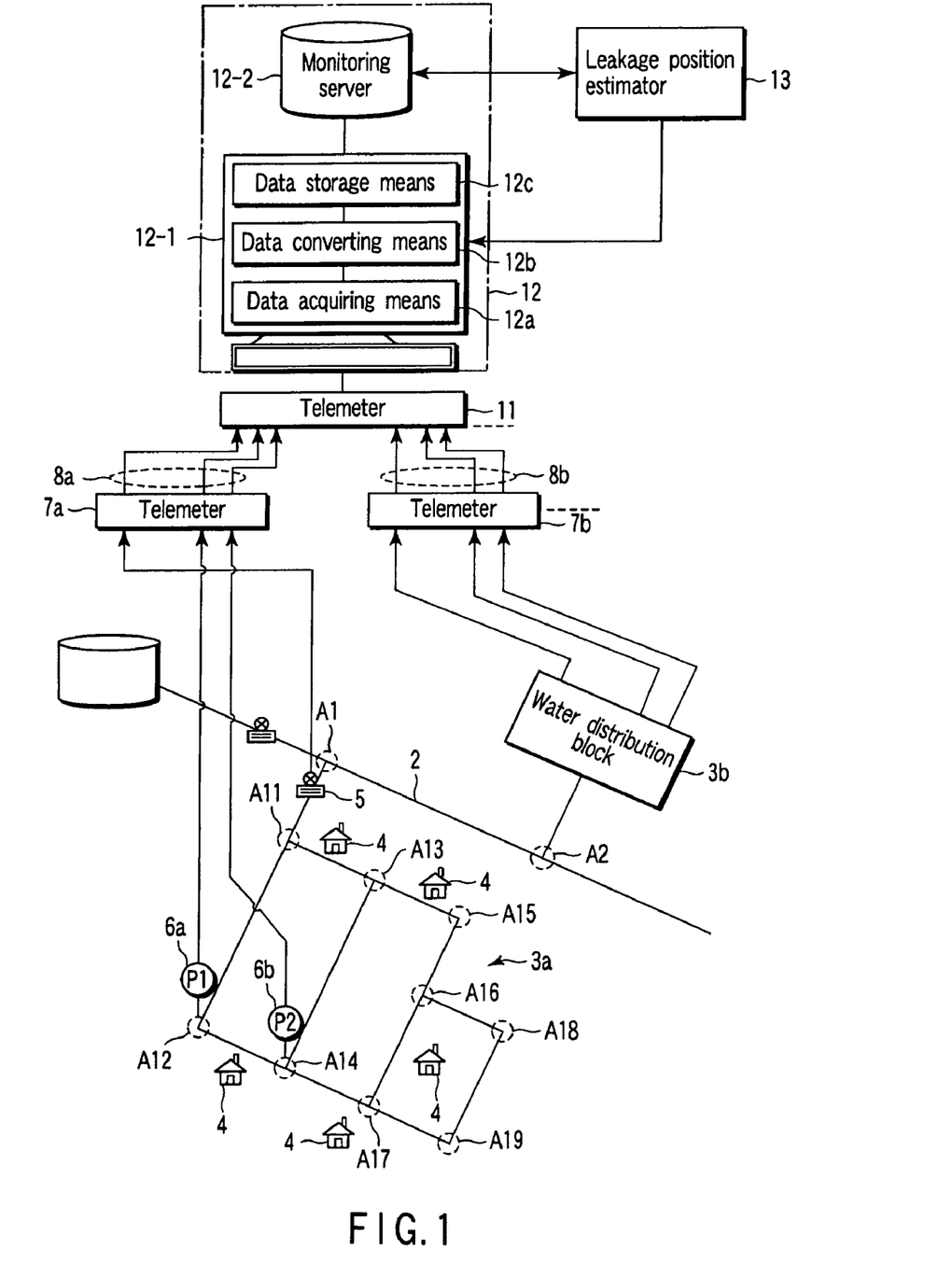
FIG. 1 is a view schematically showing the configuration of a water leakage monitoring system including a water leakage estimator according to the present invention.

Referring now to FIG. 1, a target process to which the system of the invention is applied will be hereinafter described.

The target process is a water supply process. For example, a main trunk line 2 of public water supplied from a water distribution receiver 1 is connected with a plurality of water distribution blocks 3a, 3b, . . . forming a water distribution pipeline network. Water purified in the water distribution receiver 1 is supplied to customers 4 spread over a large service area district via each distribution block 3a, 3b, . . . .

The water distribution block 3a is provided with a flow meter 5 and one or more pressure gauges 6a, 6b, . . . . The flow meter 5 is located on an inlet pipeline of the distribution block 3a, and measures an inflow rate flowing from the main trunk line 2 into the distribution block 3a. One or more pressure gauges 6a and 6b measures an internal pressure of the distribution block 3a. Likewise, water distribution blocks 3b, . . . are each provided with a flow meter 5 and one or more pressure gauges 6a, 6b, . . . .

The water distribution blocks 3a, 3b . . . are provided with telemeters 7a, 7b, . . . individually corresponding to those blocks. The telemeters 7a and 7b fetch flow rate data and pressure data measured by the flow meter 5 and pressure gauges 6a, 6b, . . . located in the distribution block 3a, 3b, . . . at a desired period. These telemeters 7a and 7b each converts the fetched data into 12-bit data, and thereafter, sends the data to a water leakage position estimating system via data transmission lines 8a, 8b, . . . . Various transmissions such as wireless, cable, public line network and Internet are given as the data transmission lines 8a, 8b, . . . . In this case, the data is sent to a water leakage monitoring system using a dedicated line specially laid for each of the flow meter 5 and pressure gauges 6a, 6b, . . . , for example.

The water leakage monitoring system is provided with a telemeter 11, a monitoring device 12 and a water leakage position estimator 13. The telemeter 11 has an interface function of receiving bit data, which is measurement data of the flow meter 5 and pressure gauges 6a, 6b sent from the telemeters 7a, 7b, . . . of the distribution blocks 3a, 3b, . . . .

When receiving bit data of the flow meter 5 and pressure gauges 6a, 6b, . . . sent via telemeters 7a, 7b, . . . , the telemeter 11 specifies a target based on the sender, that is, telemeters 7a, 7b, . . . . The target includes water distribution blocks 3a, 3b, . . . flow meter 5 and pressure gauges 6a, 6b, . . . in the distribution block 3a, 3b, . . . . Then, the telemeter 11 notifies measured result bit data including target specific data to the monitoring device 12.

An agreement of measuring sequence is previously decided between the telemeter 11 and the monitoring device 12. Then, the monitoring device 12 receives a start (synchronizing) signal sent from the telemeter 11 at first. Thereafter, the monitoring device 12 receives bit data in the order of distribution block 3a, distribution block 3b, . . . according to the foregoing measuring sequence. In this way, the monitoring device 12 can readily grasp or identify the received bit data. Specifically, the monitoring device 12 can identify the received bit data that at which of the flow meter 5 and pressure gauges 6a, 6b, . . . in any of the distribution blocks 3a, 3b, . . . the data is measured.

The monitoring device 12 is composed of a monitoring server 12-1 and a monitoring database 12-2. The monitoring server 12-1 is provided with data acquiring means 12a, data converting means 12b and data storage means 12c.

The data acquiring means 12a has a function of acquiring bit data from the telemeter 11. The bit data includes target identification data relating to the flow meter 5 and pressure gauges 6a, 6b, . . . in each of distribution blocks 3a, 3b, . . . . Telemeters 7a, 7b, . . . acquire bit data relating to a flow rate and pressure sampled for every predetermined period of time (e.g., every 0.85 sec.). In this case, the data converting means 12b has a function of converting from each bit data at 0.85 sec. period into true flow rate data and pressure data at every period required for calculation, for example, one-second period, five-second period or one-minute period. The data storage means 12c stores the flow rate data and the pressure data in time-series manner in the monitoring database 12-2 for every one-second period, for example. In this case, the means 12c classifies target into distribution blocks 3, 3b, . . . and flow meter, pressure gauges 6a, 6b, . . . according to the target specified data or based on the target specified by the data acquiring means 12a of the monitoring device.

Figure 2:
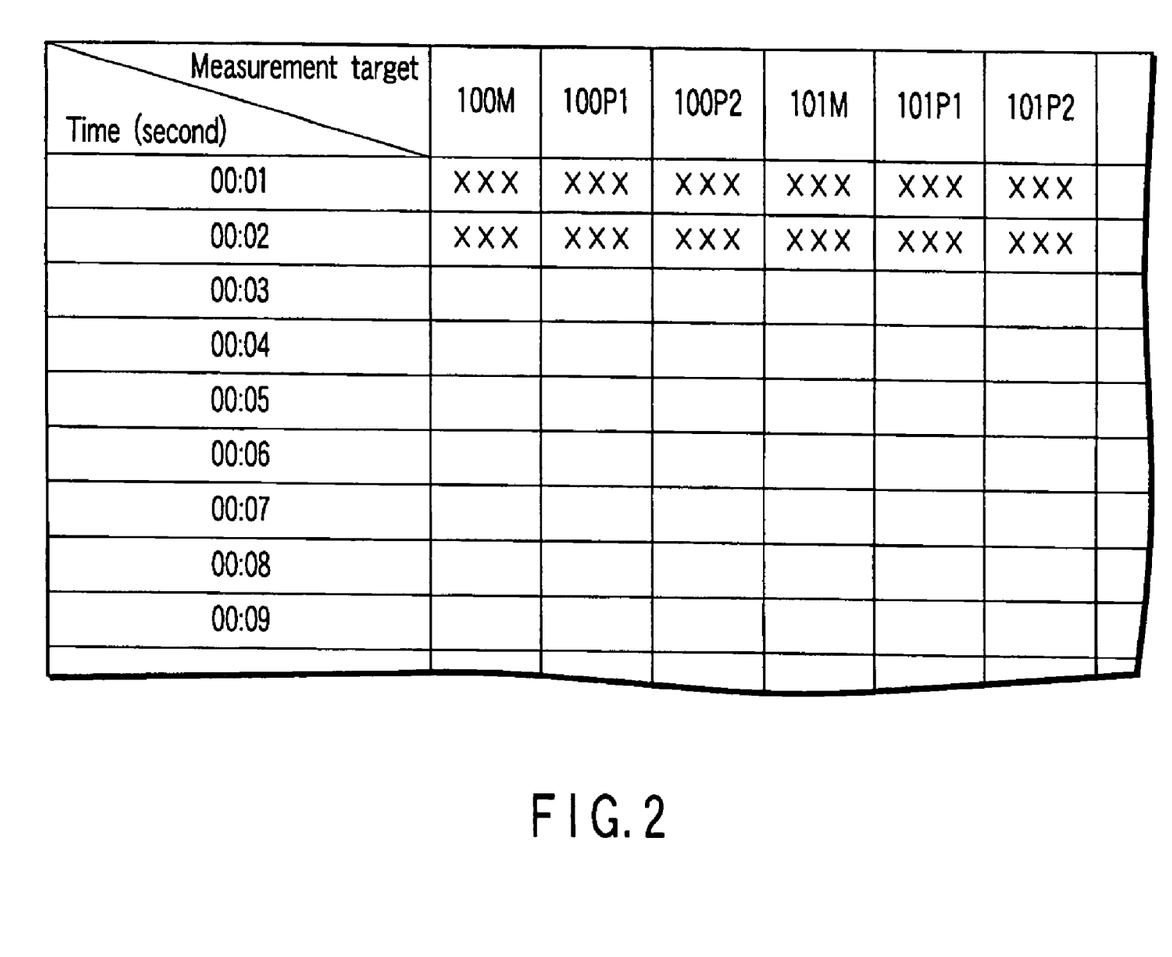
FIG. 2 is a table showing a data array stored in a monitoring database shown in FIG. 1.

FIG. 2 is a table showing one example of data array of the monitoring database 12-2. In FIG. 2, a column of "100", "101", . . . denote each water distribution block. "100M" denotes a flow meter 5 located in the distribution block "100". "100P1" and "100P2" denote two pressure gauges 6a and 6b located in the distribution block "100". Each row denotes data acquiring time every predetermined period. Namely, data is classified every distribution block 3a, 3b, . . . and flow meter, pressure gauges 6a, 6b, . . . . In this way, flow rate data xxx and pressure data xxx are successively accumulated every one-second period.

The water leakage position estimator 13 will be explained every embodiment described later.

First Embodiment

Figure 3:
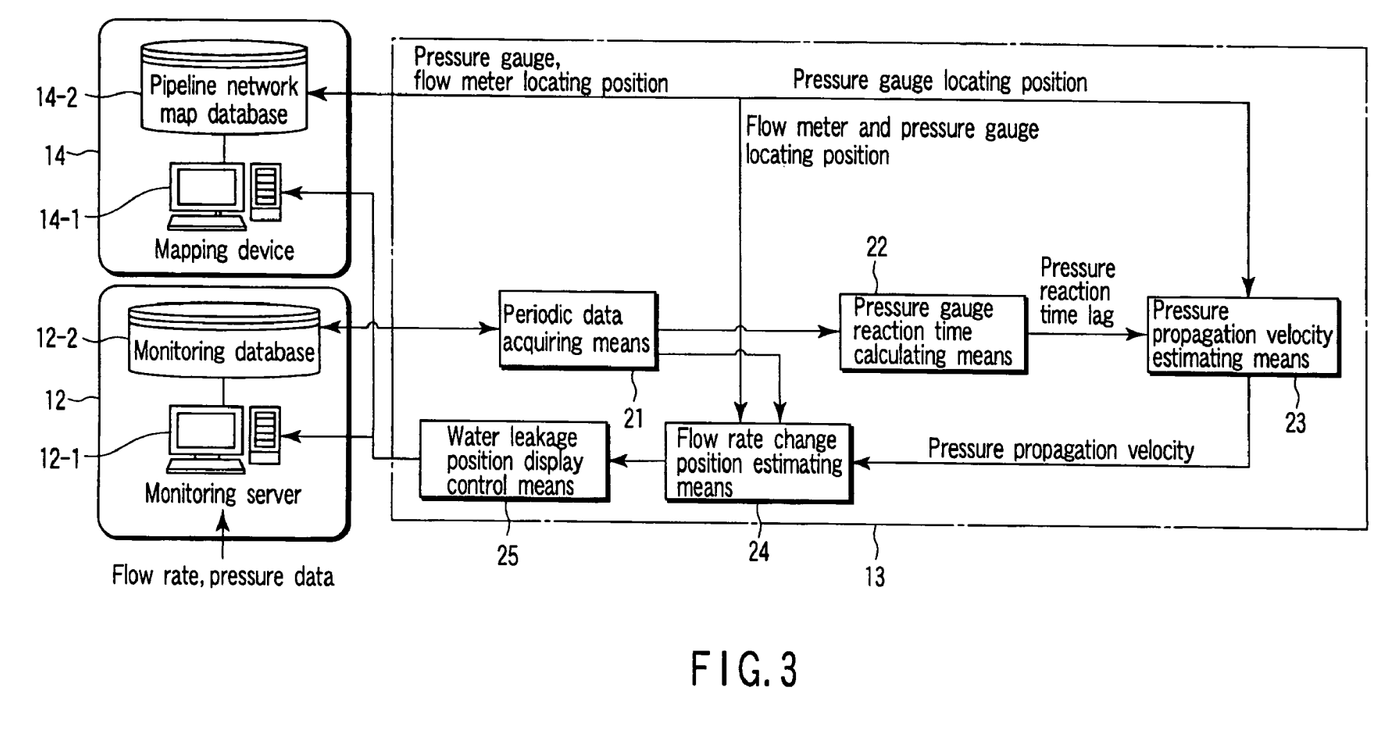
FIG. 3 is a view showing the configuration of a water leakage monitoring system to explain a first embodiment of the water leakage estimator according to the present invention.

FIG. 3 is a block diagram showing the configuration of a water leakage monitoring system to explain a first embodiment of the water leakage position estimator 13 according to the present invention.

The water leakage monitoring system is provided with a water distribution pipeline network map creator 14 in addition to the foregoing monitoring device 12 and water leakage position estimator 13.

The water distribution pipeline network map creator 14 is provided with a mapping device 14-1 and a pipeline network map database 14-2. The mapping device 14-1 generates a pipeline network connecting a main trunk line, distribution blocks 3a, 3b, . . . and (equipments) such as flow meters 5, and pressure gauges 6 located in the main trunk line and the distribution blocks 3a, 3b, . . . as an image display generated on the basis of a water distribution pipeline network design. The mapping device 14-1 creates a water distribution pipeline network map defining a locating position showing a distance between neighboring equipments (water distribution receiver 1, main trunk line 2, flow meters 5, 6a, 6b, . . . ) in each of the distribution blocks 3a, 3b, . . . forming the pipeline network. The pipeline network map database 14-2 stores water distribution pipeline network map data created by the mapping device 14-1.

The mapping device 14-1 further inputs the distance data to create image-display pipeline network map data in distribution blocks 3a, 3b, . . . . For example, the distance data includes a pipeline connecting point A1 showing a distance from the water distribution receiver 1 to the distribution block 3a, a flow meter locating position showing a distance from the pipeline connecting point A1 to the flow meter 5, a pressure gauge locating position showing a distance from the flow meter 5 to each of pressure gauges 6a, 6b, . . . , and a connecting point position showing a distance from the flow meter 5 to pipeline connecting points A11 to A19 of distribution pipelines forming the distribution blocks 3a, 3b, . . . .

The water leakage position estimator 13 according to the present invention will be hereinafter described.

The water leakage position estimator 13 includes period data acquiring means 21, pressure gauge reaction time calculating means 22, pressure propagation velocity estimating means 23, flow rate change position (water leakage position) estimating means 24, and water leakage position display control means 25.

The period data acquiring means 21 determines a change of flow rate and an change of pressure independently from the flow rate data and the pressure data of one-second period fetched from the monitoring database 12-2. Then, the means 21 outputs a trigger signal with flow rate change time and pressure change time or change data in place of the trigger signal if necessary. Or, the means 21 outputs flow rate data and pressure data before and after change and changed (hereinafter, referred to as a signal related to flow rate change and pressure change).

The pressure gauge reaction time calculating means 22 calculates a pressure reaction time difference between pressure gauges 6a and 6b from each pressure change time contained in a signal related to the two pressure changes output from the period data acquiring means 21. Thereafter, the means 22 sends the calculated pressure reaction time difference to the pressure propagation velocity estimating means 23.

The pressure propagation velocity estimating means 23 estimates a pressure propagation velocity using the pressure reaction time difference and pressure gauge locating positions (locating distance) related to the foregoing two pressure gauges 6a and 6b fetched from the pipeline network map database 14-2.

The flow rate change position estimating means 24 has the following function. According to the function, when receiving a signal related to the flow rate change output from the period data acquiring means 21, the means 24 estimates a flow rate change position (equivalent to water leakage position) of the distribution pipeline forming the distribution block 3a based on the following information. One is the flow rate location position (locating distance) from the pipeline network map data of the pipeline network database 14-2. Another is two pressure gauge locating position and pressure propagation velocity. Here, the water leakage position indicates a crack and breakage of the pipeline, and a factor of increasing a flow rate (e.g., specifying an operating water receiving tank described later in this embodiment). According to another embodiment, the water leakage position does not indicate the crack and breakage of the pipeline, but the following positions are included. One is a decrease of a pipe bore and a wall thickness by abrasion of the pipeline. Another is a factor of giving an influence to the pipeline in future.

The water leakage position display control means 25 sends data related to the water leakage position of the distribution pipeline forming the distribution block 3a received from the flow rate change position estimating means 24 to the monitoring server 12-1 and the mapping device 14-1. Then, the means 25 displays information that a flow rate change equivalent to water leakage is made on the monitoring server 12-1. The means 25 further displays information that a marking is given to the pipeline network in the vicinity of a pipeline having a flow rate change on the mapping device 14-1.

The operation of the water leakage position estimator 13 having the foregoing configuration will be hereinafter described.

First, when the estimator 13 estimates a water leakage position, the following data has been stored in the monitoring database 12-2 of the monitoring device 12. As shown in FIG. 2, the data is one-second period flow rate data and pressure data related to the flow meter 5 and two pressure gauges 6a, 6b located in each of the distribution blocks 3a, 3b, . . . .

In this state, the period data acquiring means 21 of the water leakage position estimator 13 specifies the water distribution block 3a, for example. Thereafter, the means 21 successively reads one-second period flow rate data M and pressure data P1, P2 including measured time from the monitoring database 12-2. Then, the means 21 successively compares the previous flow rate with this-time flow rate. If the difference between the foregoing two flow rates exceeds a preset value estimating a water leakage, the means 21 determines that there exists a flow rate change at a certain measured time. Then, the means 21 sends a signal related to the flow rate change including the measured time in the distribution block 3a to the flow rate change position estimating means 24.

Likewise, the period data acquiring means 21 compares the previous pressure with this-time pressure with respect to two pressure data P1 and P2. If the pressure difference between the two pressures exceeds a preset value, the means 21 determines that there exists a pressure change. Then, the means 21 sends a signal related to the pressure change including the measured time to the pressure gauge reaction time calculating means 22.

The pressure gauge reaction time calculating means 22 calculates a time difference having the pressure change between two pressure gauges 6a and 6b from a signal related to a pressure change including two measured times.

Figure 4:
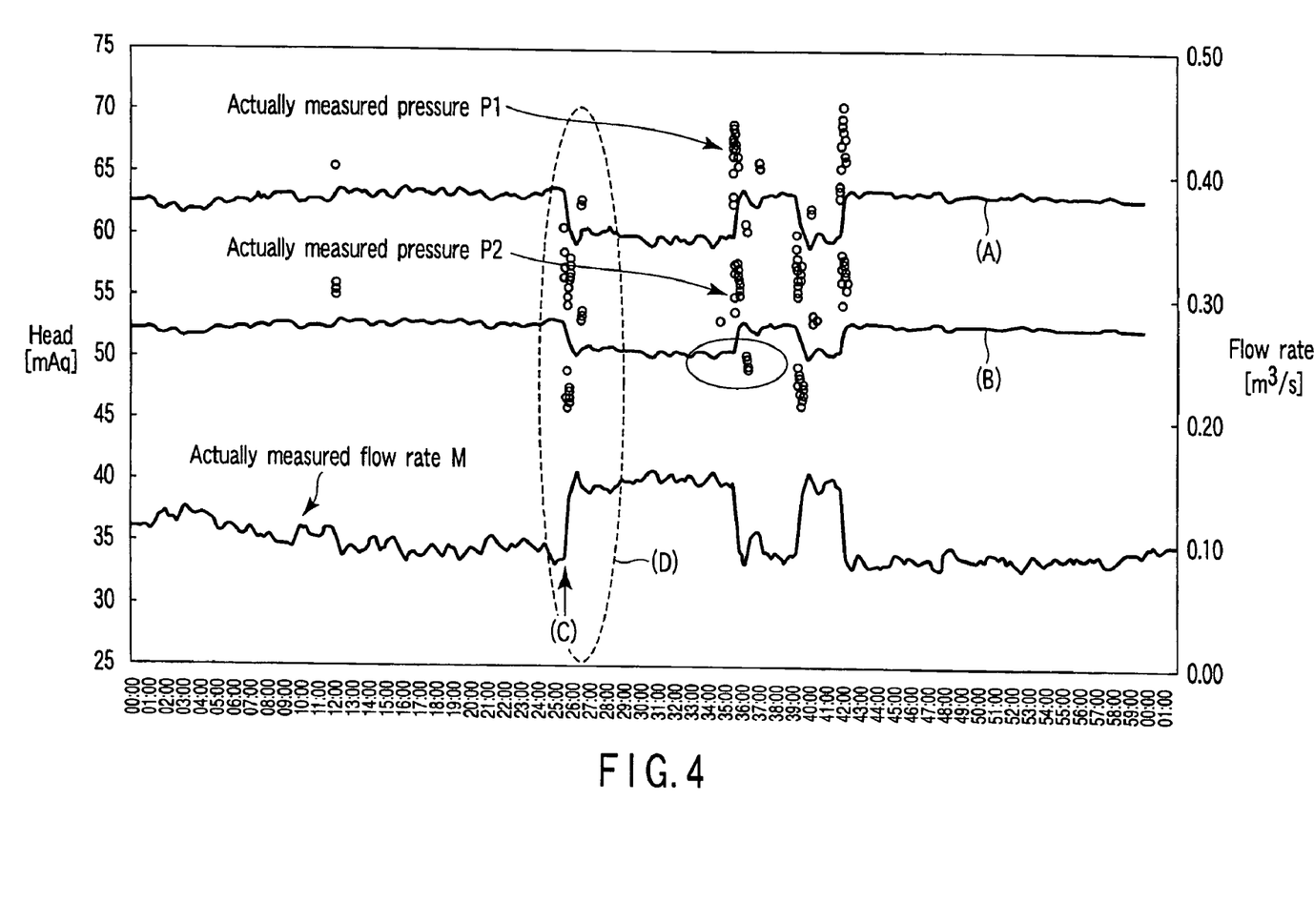
FIG. 4 is a graph showing each transition of flow rate data and pressure data at every one second period actually measured by a flow meter and a pressure gauge installed in a water distribution block.

FIG. 4 is a graph showing a change transition of a one-second period actually measured flow rate M and pressures P1, P2 measured by the flow meter 5 and two pressure gauges 6a, 6b in a water distribution block 3a, for example. In FIG. 4, the abscissa takes time every one-second period, and the left side ordinate takes a head (of fluid) [maq], and further, the right side ordinate takes a flow rate [m³/s].

In FIG. 4, a loss of head (pressure) $H_{loss}$ of pressures (A) and (B) shown by a solid line is obtained from the flow rate in the following manner. Specifically, an arithmetic operation is executed based on a predetermined formula, for example, Hezen-Williams modified formula using a least squares method and using the virtual total pipeline elongation L of every day and a flow rate correction coefficient α as parameters for obtaining the loss of head $H_{loss}$. In order to obtain the loss of head (pressure) $H_{loss}$, the output side of the data converting means 12b of the monitoring server 12-1 is provided with pressure approximate expression operating means. For example, the data converting means 12b converts the data obtained from the foregoing means into time-series flow rate data of a predetermined period (e.g., five-second period). Thereafter, the loss of head (pressure) $H_{loss}$ is obtained from the following Hezen-Williams modified formula.

$$H_{loss}=10.67 \times L \times Q^{1.85 \times \alpha}/(C^{1.85} \times D^{4.87}) \quad (1)$$

where, L: virtual total pipeline elongation (m), Q: flow rate data of flow meter, C: current coefficient (110 herein), D: pipe bore, $\alpha$: flow rate correction coefficient of water distribution block.

When the pipeline network of the distribution block is approximated as a virtual one pipeline, rough loss of head $H_{loss}$ is obtained from the following equation.

$$H_{loss}=10.67 \times L/(C^{1.85} \times D^{4.85}) \quad (2)$$

where, L: virtual total pipeline elongation, C: pipeline coefficient, D: pipe bore.

Figure 6:
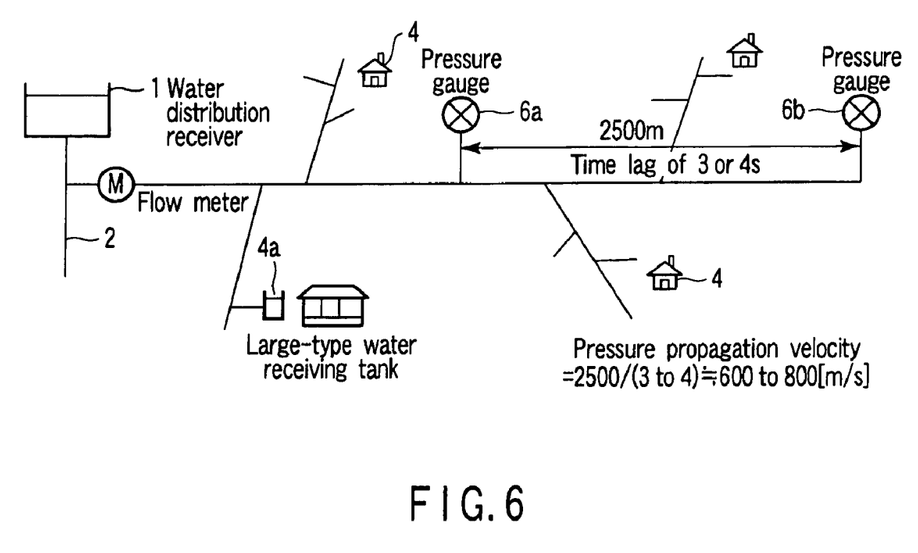
FIG. 6 is a view showing a water distribution pipeline network map of an area included a flow meter and a pressure gauge.

A distribution pipeline of the distribution block 3a is provided with a 30 m3 water receiving tank 4a (see FIG. 6). In FIG. 4, the water receiving tank 4a is operated at a time point shown by (C). As seen from FIG. 4, when the actually measured flow rate M increases with the operation of the water receiving tank 4a, it can be seen that actually measured pressures P1 and P2 decrease at approximately the same time.

Figure 5:
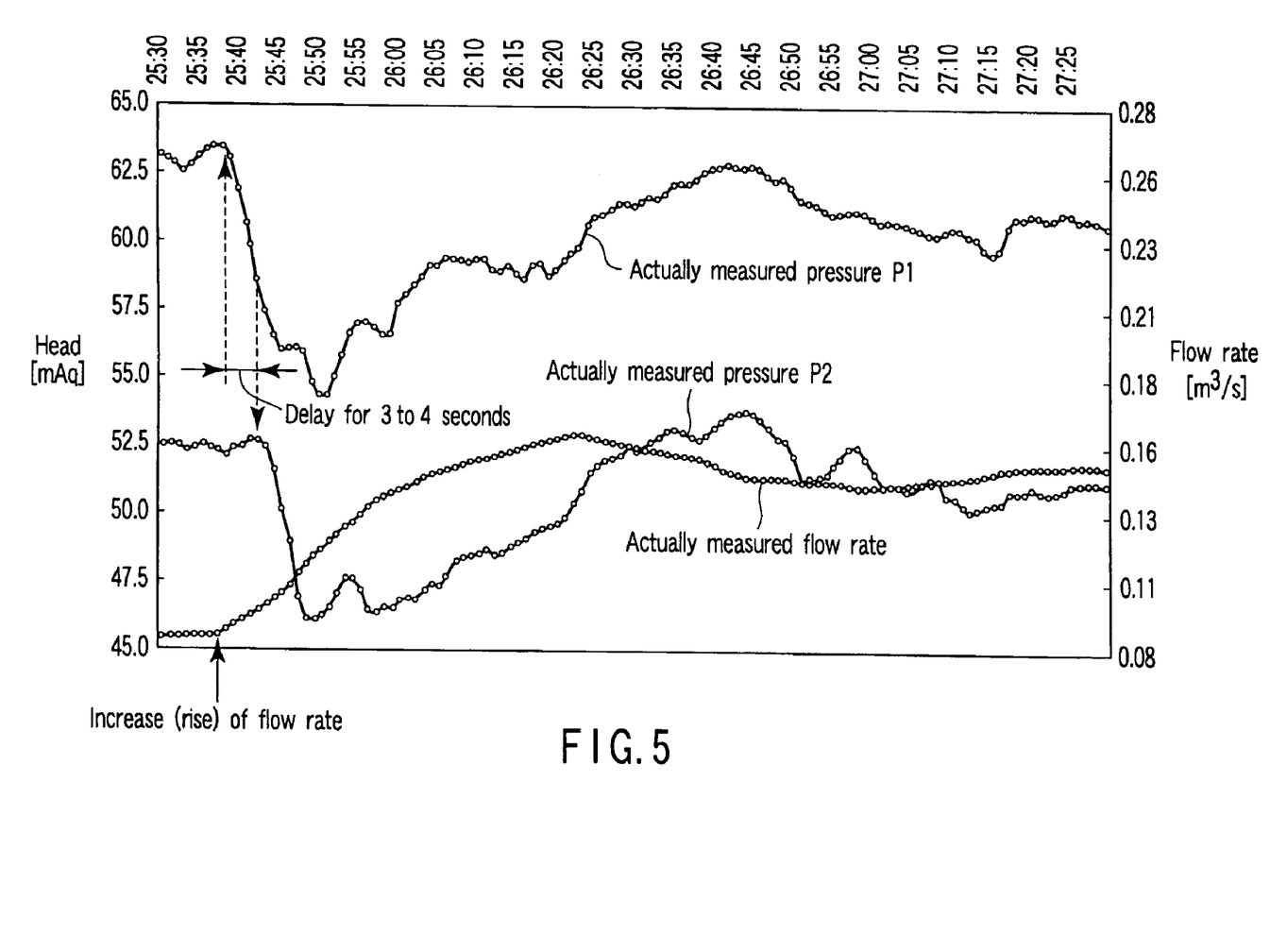
FIG. 5 is a graph enlarging an area (D) shown in FIG. 4.

FIG. 5 is a graph enlarging an area (D) surrounded by a dotted line in FIG. 4.

As is evident from FIG. 5, when the actually measured flow rate M starts increasing with the operation of the water receiving tank 4a, the actually measured pressure P1 of the pressure gauge 6a is lowered with a rise of the flow rate. Thereafter, it can be seen that the actually measured pressure P2 of the pressure gauge 6b is lowered after a delay of about 3 to 4 seconds. This 3 to 4 second time lag depends on a pressure propagation velocity in the pipe.

Namely, the pressure gauge reaction time calculating means 22 calculates a pressure reaction time lag (3 to 4 seconds) from two measured times included in signals related to a pressure change of actually measured pressures P1 and P2. Thereafter, the means 22 sends the pressure reaction time lag to the pressure propagation velocity estimating means 23.

When receiving the pressure reaction time lag, the pressure propagation velocity estimating means 23 fetches pressure gauge locating position (locating distance) related to two pressure gauges 6a and 6b, for example, distance data between two pressure gauges 6a and 6b from the pipeline network map database 14-2. Then, the means 23 estimates a pressure propagation velocity. Now, when the distance between pressure gauges 6a and 6b fetched from the pipeline network map database 14-2 is set as about 2500 m as shown in FIG. 6, the means 23 executes an operation of 2500 m/(3 to 4) seconds, and then, estimates a pressure propagation velocity=600 to 800 [m/s]. Thereafter, the means 23 sends the estimated pressure propagation velocity to the flow rate change position estimating means 24.

When receiving a signal related to a flow rate change from the period data acquiring means 21, the flow rate change position estimating means 24 fetches the following data from the pipeline network map database 14-2. One of the data is a flow meter locating position of the flow meter 5 of the water distribution block 3a. Another is pressure gauge locating positions of pressure gauges 6a and 6b. Another is a locating position related to the water receiving tank 4a. Then, the means 24 takes the following factors into consideration. One is that the flow rate increase time of the flow meter 5 and the pressure decrease time of the pressure gauge 6a have approximately equal time lag. Another is that the flow rate change of the flow meter 5 is a large flow rate change different from a crack of the distribution pipeline. Another is a distance obtained from the pressure propagation velocity. Thus, the means 24 estimates the flow rate change as a flow rate change position (leakage position) by the operation of the water receiving tank 4a located between the flow meter 5 and the pressure gauge 6a. Then, the means 24 sends the foregoing flow rate change position to the water leakage position display control means 25.

The flow rate change position estimating means 24 is storable with reference data for additionally estimating a water leakage position based on past experience and knowledge. For example, pressure change time lag to pressure gauges 6a and 6b with respect to a flow rate change may be set in the flow meter 5 every estimated flow rate change factor (crack, breakage, operation of water receiving tank 4a) in the following various equipments). Namely, one is the water receiving tank existing in the vicinity of the locating position of the flow meter 5, pressure gauges 6a and 6b. Another is each distribution pipeline to each customer.

The flow rate change position estimating means 24 estimates a flow rate change position in the manner described above. Then, the means 24 sends the estimated flow rate change position to the monitoring server 12-1 and the mapping device 14-1 via the water leakage position display control means 25 together with water distribution block identification data.

The monitoring server 12-1 stores flow rate change position data in the monitoring database 12-2 together with the water distribution block identification data. Thereafter, the monitoring server 12-1 displays information that a flow rate change concerning water leakage exists in the distribution block 3a.

The mapping device 14-1 stores the flow rate change position data in proper storage means together with water distribution block identification data. Thereafter, when receiving display instructions from the monitoring device 12, the mapping device 14-1 displays the pipeline network related to the distribution block shown in FIG. 6 on a display unit from the pipeline network database 14-2 based on the water distribution block identification data. The mapping device 14-1 displays information that a mark is given to the flow rate change position based on the flow rate change position data.

Therefore, the foregoing embodiment has the configuration below; therefore, the following effect is obtained. Specifically, a change of one-second period measured data measured by the flow meter 5, pressure gauges 6a and 6b located in each of water distribution blocks 3a, 3b, . . . is caught. If a flow rate change is given, pressure reaction time is calculated from the pressure change of each of pressure gauges 6a and 6b. A pressure propagation velocity is calculated from the pressure reaction time and the locating position between pressure gauges 6a and 6b. Thereafter, the pressure propagation velocity, already recorded locating positions of the flow meter 5, pressure gauges 6a and 6b of the distribution block and the locating position of the water receiving tank 4a near thereto are fetched to estimate a flow rate change position. Then, a flow rate change position by water leakage is output. Accordingly, it is possible to speedy and easily grasp the flow rate change position including water leakage in a state that any of water distribution blocks 3a, 3b, . . . is specified.

Second Embodiment

Figure 7:
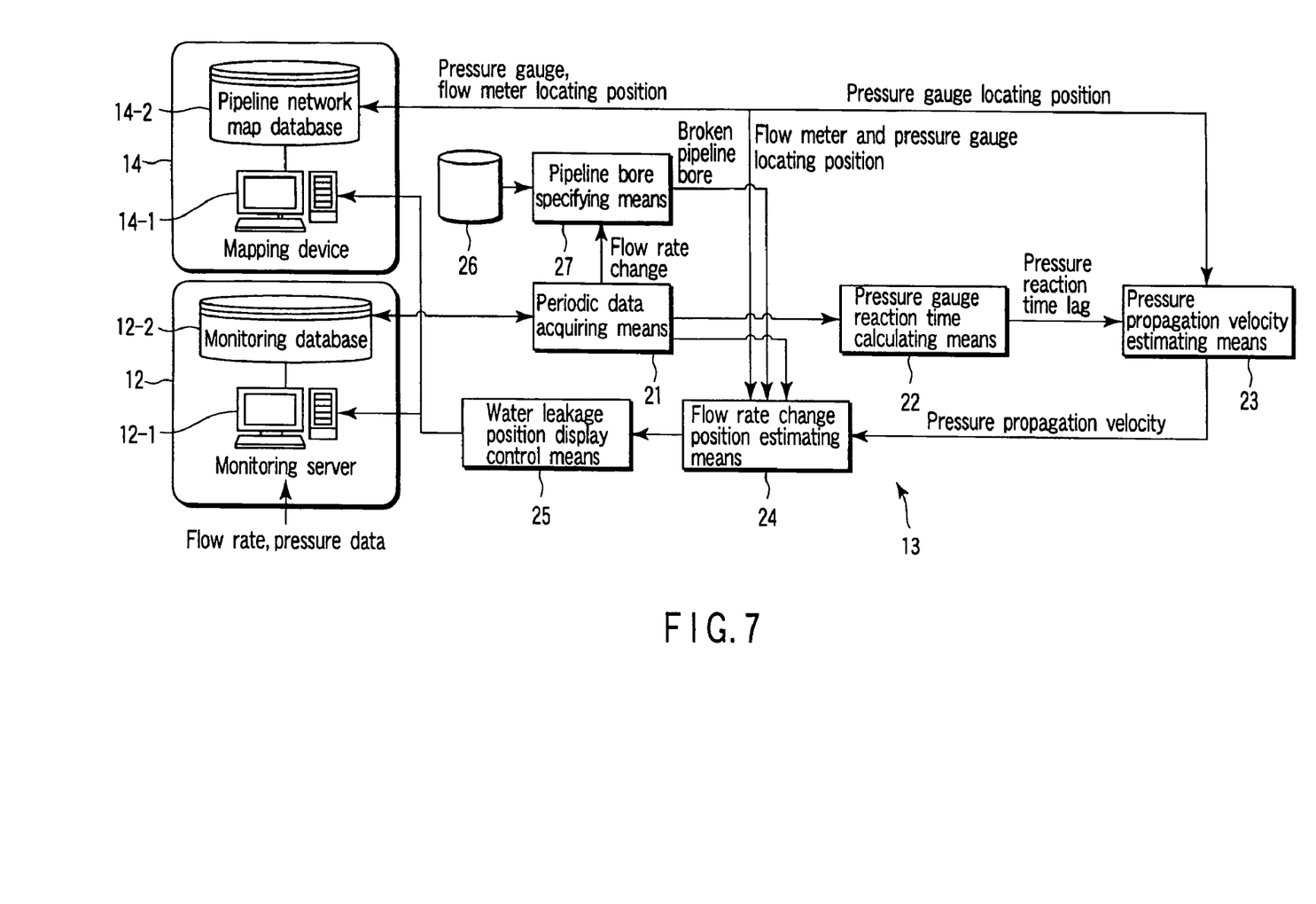
FIG. 7 is a view showing the configuration of a water leakage monitoring system to explain a second embodiment of the water leakage estimator according to the present invention.

FIG. 7 is a block diagram showing the configuration of a water leakage monitoring system to explain a second embodiment of a water leakage position estimator according to the present invention.

A water leakage position estimator 13 of the second embodiment has approximately the same configuration as FIG. 3 described in the first embodiment. Thus, the same reference numerals are used to designate the identical or equivalent portions, and the explanation of FIG. 3 is applied. In the following description, different portions will be described in particular.

According to this embodiment, the water leakage position estimator 13 is newly provided with the following two means in addition to configuration means of the first embodiment. One is bore specifying reference data storage means 26, and another is pipeline bore specifying means 27 for specifying a bore of a pipeline having a flow rate change.

Figure 8:
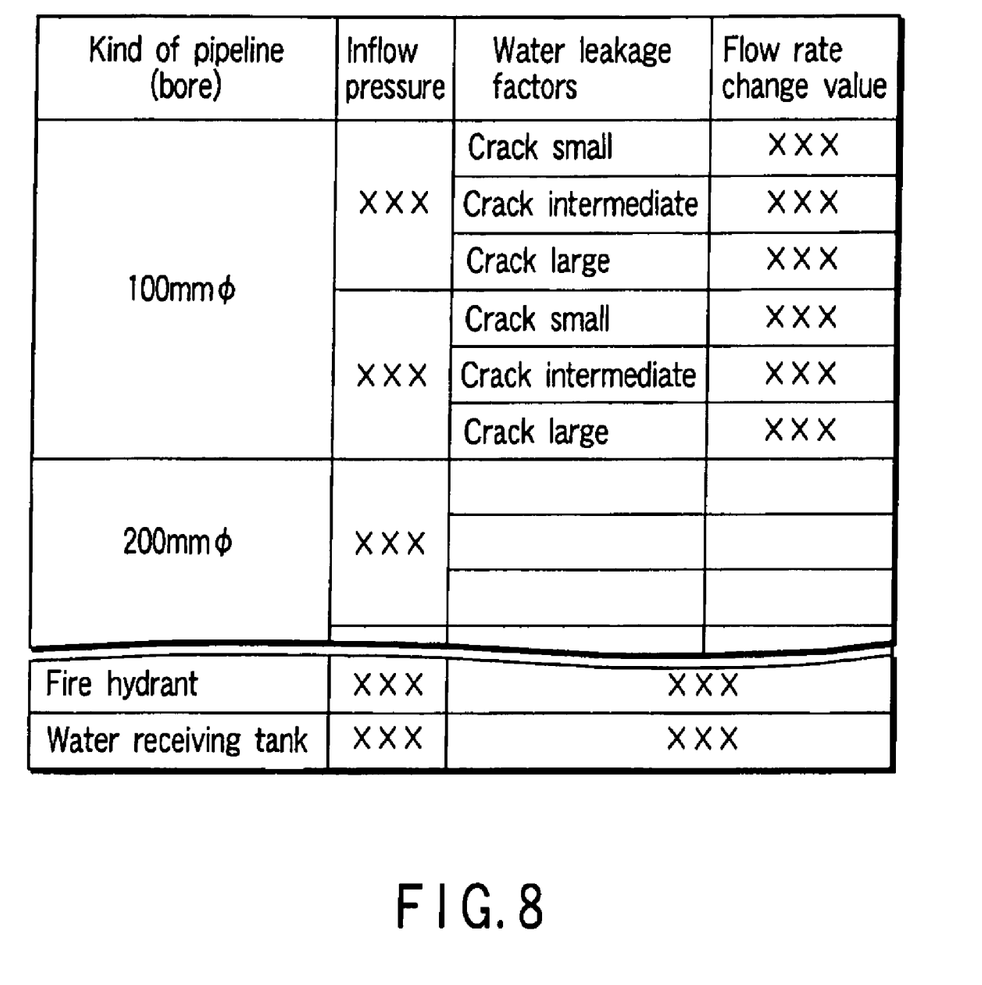
FIG. 8 is a table showing reference data for specifying a water leakage factor pipeline bore.

The bore specifying reference data storage means 26 is stored with reference data based on past experiences. Specifically, when flow rate change factors (crack, breakage, etc.) are given to every kind (bore size) of each distribution pipeline forming the distribution block 3a, 3b, . . . , a degree of the generated flow rate change is previously set. For example, the following parameters are previously set as shown in FIG. 8. The parameters include the kind (bore) of distribution pipelines, a plurality of expected pipeline inflow pressures. The parameters further include flow rate change factors (large, intermediate and small of crack, large, intermediate and small of breakage) and a flow rate change.

The pipeline bore specifying means 27 is provided on the output side of the period data acquiring means 21. When receiving a signal related to a flow rate change estimated as water leakage from the period data acquiring means 21, the means 27 specifies a bore of the flow rate target distribution pipeline.

Specifically, the period data acquiring means 21 fetches one-second period time-series flow rate data from the monitoring database 12-2. Then, the means 21 compares the previous flow rate with this-time flow rate. If a change between the foregoing two flow rates exceeds a preset value estimated as water leakage, the means 21 sends the flow rate change signal to the pipeline bore specifying means 27.

When receiving the flow rate change from the period data acquiring means 21, the pipeline bore specifying means 27 refers to the reference data stored in the bore specifying reference data storage means 26. Thereafter, the means 27 determines a bore of the distribution pipeline based on the flow rate change and the inflow pressure (e.g., actually measured pressure). Then, the means 27 sends the determined bore to the flow rate change position estimating means 24.

Then, the flow rate change position estimating means 24 receives a signal related to the flow rate change together with distribution block identification data as described in the first embodiment. Thereafter, the means 24 estimates a flow rate change position (water leakage position) showing that the flow rate change is made at a position within some meters radius from the pressure gauge 6a, for example. In this case, the means 24 estimates the flow rate change position using the following parameters. One of the parameters is a pressure propagation velocity obtained by the pressure propagation velocity calculating means 23. Another is the flow meter locating position of the flow meter 5 read from the pipeline network map database 14-2. Another is pressure gauge locating positions of the pressure gauges 6a and 6b and other necessary position data. Thereafter, the means 24 sends the bore of the distribution pipeline having a flow rate change determined by the pipeline bore specifying means 27 to the monitoring server 12-1 and the mapping device 14-1 together with the estimated flow rate change position via the water leakage position display control means 25.

The monitoring server 12-1 displays information that the distribution pipeline having a pipe bore has a flow rate change estimating water leakage. The mapping device 14-1 fetches pipeline network map data of the corresponding distribution block 3a, for example, from the pipeline network database 14-2 based on the distribution block identification data. Then, the mapping device 14-1 displays information that water leakage occurs in the distribution pipeline having a xx pipe bore provided on the flow rate change position.

Other operation is the same as the first embodiment; therefore, the explanation is omitted referring to the first embodiment.

Therefore, according to the second embodiment, if a flow rate change estimated as the flow rate change factor is made, the flow rate change position is estimated. The bore of the distribution pipeline buried in the flow rate change position is specified. In this way, the same effect as the first embodiment is obtained, and others, temporary repairs or measures is speedy and properly taken.

Figure 9:
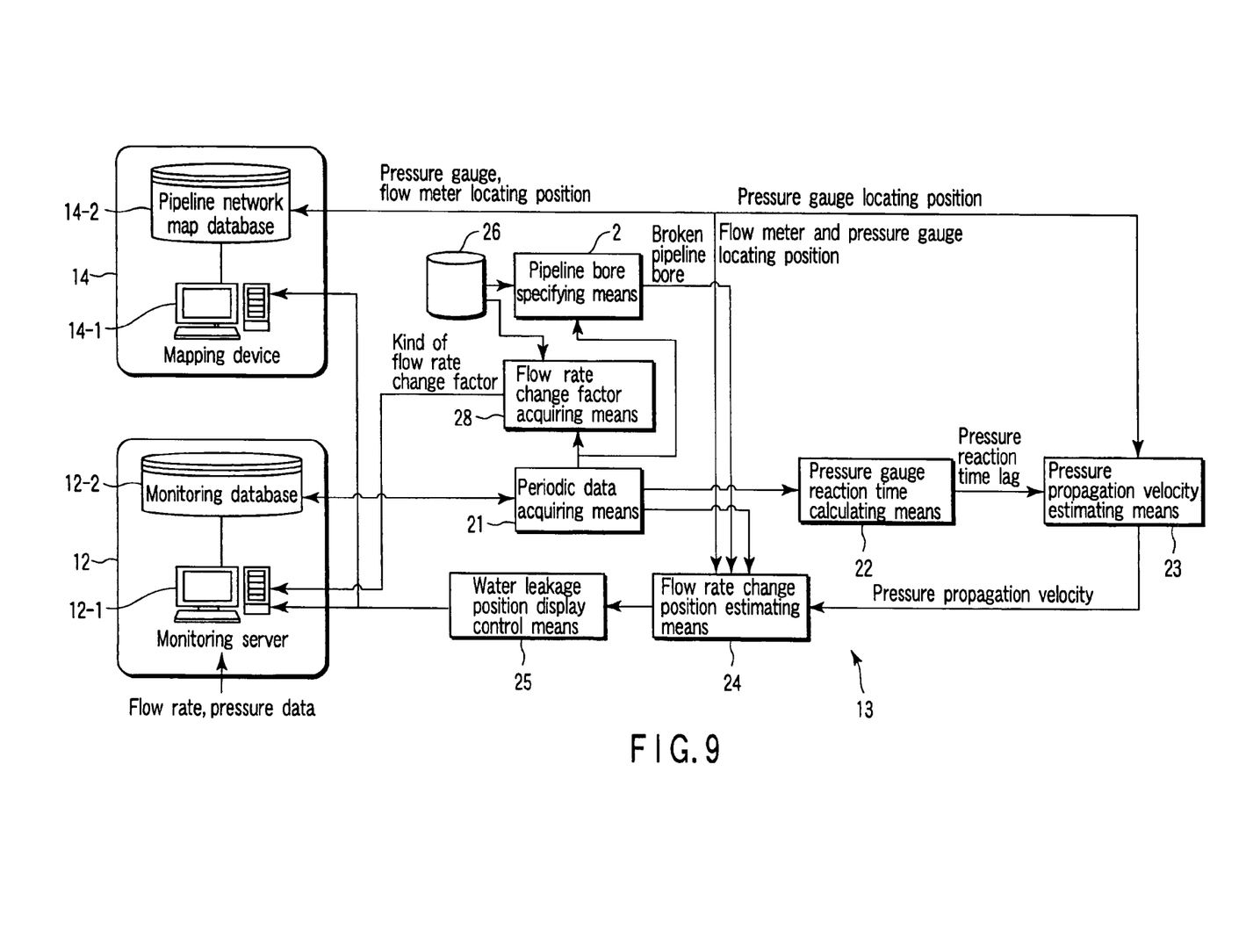
FIG. 9 is a view showing the configuration of a water leakage monitoring system to explain another example of the second embodiment of the water leakage estimator according to the present invention.

FIG. 9 shows another configuration of the second embodiment. For example, the output side of the period data acquiring means 21 is provided with flow rate change factor acquiring means 28 as seen from FIG. 9.

Specifically, the bore specifying reference data storage means 26 sets the following flow rate changes in the stored flow rate change factor (kind of pipeline) in addition to crack and breakage of the distribution pipeline. For example, one is a flow rate change when a fire hydrant is used. Another is a flow rate change when the water receiving tank 4a is operated. Another is a flow rate change when other equipments are operated. When receiving a flow rate change estimated as water leakage from the period data acquiring means 26, the flow rate change factor acquiring means 28 refers to the reference data of the bore specifying reference data acquiring means 26. Then, the means 28 searches a flow rate change factor corresponding to the flow rate change from items of the kind of pipeline showing flow rate change factors. In this case, the means 26 is previously stored with a direct water leakage factor like a crack and a breakage of the pipeline. For example, a flow rate change when a fire hydrant is used and a flow rate change when the water receiving tank 4a is used are preset. This serves to specify a flow rate change factor from the reference data by the flow rate change factor acquiring means 28 in accordance with the flow rate change. Namely, it can be seen that the factors of the flow rate change result from any of the following matters. One of the factors is the crack or breakage of the distribution pipeline. Another is a factor resulting from using a fire hydrant. Another is a factor resulting from operating the water receiving tank 4a. Another is a factor resulting from using other equipments. Thereafter, the means 28 sends the specified flow rate change factor to the monitoring server 12-1. In this case, data such as the flow rate change position and pipe bore described in the first and second embodiments are simultaneously sent to the monitoring server 12-1.

When at least flow rate change position data is sent from the flow rate change position estimating means 24, the monitoring server 12-1 displays a specific flow rate change factor, for example, information that a flow rate change by using a fire hydrant is made.

Therefore, according to this modified embodiment, the effect of the first and second embodiments is obtained. In addition, it is possible to easily grasp information that the flow rate change is made by operating any of equipments located within a range (water leakage equivalent position) of a distribution pipeline of the distribution block 3a, 3b, . . . .

Third Embodiment

Figure 10:
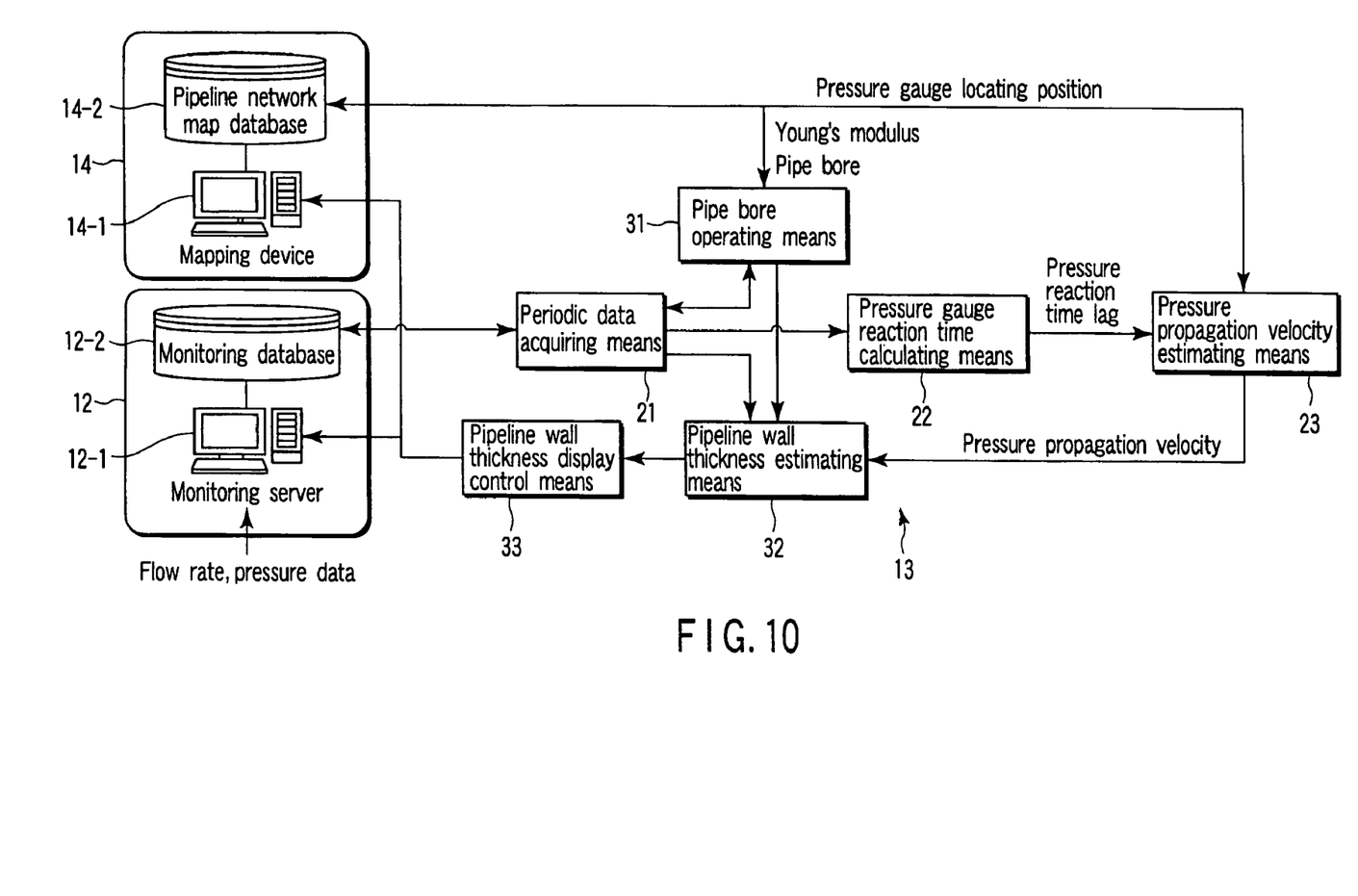
FIG. 10 is a view showing the configuration of a water leakage monitoring system to explain a third embodiment of the water leakage estimator according to the present invention.

FIG. 10 is a block diagram showing the configuration of a water leakage monitoring system to explain a third embodiment of a water leakage position estimator according to the present invention.

Prior to the explanation of this embodiment, the following theoretical physical modulus has been known. The pressure propagation velocity is estimated by the foregoing pressure propagation velocity estimating means 23. In addition, the pressure propagation velocity is obtained from the following physical equation (1) ("Doboku Kogaku Kiso Series 5-2 Hydraulics", pp. 150-152, Author: Mr. Nobuyuki TAMAI, Publisher: Baifukan, Published date: 1989, 1, 10)

$$\alpha = \{(K/\rho)/[1+(K/E)(D/e)]\}^{1/2} \quad (3)$$

where, $\alpha$: Pressure propagation velocity, K: Volume elasticity (2.06 [GPa] in water), $\rho$: Water density (1000 [kg/m$^3$]) D: Pipe bore [mm], e: Pipe wall thickness [mm], E: Young's modulus 158 [GPa] (Case of ductile iron pipe)

Thus, it can be seen from the foregoing equation (3) that the pressure propagation velocity a is affected by the pipe bore D and the wall thickness e. This results from the following matter. Specifically, the pressure propagation velocity is obtained from the actual reaction time lag between pressure gauges 6a and 6b. In this case, the known pressure propagation velocity is substituted for the foregoing equation (3), and thereby, an unknown wall thickness of the target distribution pipeline is obtained using an inverse operation of the equation (3).

A water leakage position estimator 13 of the third embodiment is provided with period data acquiring means 21, pressure gauge reaction time calculating means 22 and pressure propagation velocity estimating means 23 like FIG. 3. In addition, the estimator 13 is provided with pipe bore calculation means 31, pipeline wall thickness estimating means 32 and pipeline wall thickness display control means 33. Thus, it is possible to estimate the wall thickness of the distribution pipeline having a flow rate change.

The foregoing period data acquiring means 21, pressure gauge reaction time calculating means 22 and pressure propagation velocity estimating means 23 are the same as FIG. 3; therefore, the explanation is omitted herein.

When receiving a signal related to a flow rate change from the period data acquiring means 21, the pipe bore calculation means 31 fetches the following data from the distribution pipeline network map database 14-2. For example, one is Young's modulus related to the distribution pipeline forming the distribution block 3a. Another is bore data of the distribution pipeline connecting the flow meter 5 and the pressure gauge 6a. Another is bore data of the pipeline connecting pressure gauges 6a and 6b. If the bore of the distribution pipeline fetched from the distribution pipeline network map database 14-2 is different, that is, pipelines having different bore are mutually connected, the pipe bore calculation means 32 makes the following operation. In this case, the means 32 makes a moving-average operation to obtain an average value of the pipe bore, and thereafter, sends Young's modulus and pipe bore to the pipeline wall thickness estimating means 32. Of course, if the distribution pipeline has one bore, the pipe bore operating means 31 sends the bore of the pipeline and Young's modulus to the pipeline wall thickness estimating means 32.

The pipeline wall thickness estimating means 32 executes an operation of the foregoing equation (1) using following fixed parameters. One is pressure propagation velocity data sent from the pressure propagation velocity estimating means 23 based on a flow rate change. Another is Young's modulus in addition to a pipe bore received from the pipe bore operating means 31. Then, the means 32 calculates and estimates a wall thickness of the distribution pipeline having a flow rate change in the distribution block. Thereafter, the means 32 outputs the obtained pipeline wall thickness estimation value to the monitoring server 12-1 and the mapping device 14-1 via the pipeline wall thickness display control means 33.

Therefore, according to the third embodiment, the pressure propagation velocity is estimated from the actual reaction time lag between pressure gauges 6a and 6b. In this way, it is possible to readily know the wall thickness of the distribution pipeline having a flow rate change based on the foregoing equation (1) using the estimated pressure propagation velocity and already known data.

According to another embodiment in which the pressure gauges 6a and 6b, for example, are not provided and the pressure gauge reaction time lag cannot be calculated, it is impossible to estimate pressure propagation velocity.

For example, in a case wherein the pressure gauges 6a only are provided, the distribution pipeline network map database 14-2 may be previously stored with pipe bore, wall thickness and Young's modulus in the water distribution block. In this way, it is possible to estimate pressure propagation velocity by the equation (1) using the foregoing data read from the distribution pipeline network map database 14-2.

According to still another embodiment, pressure propagation velocity operating means (not shown) is provided in place of the pipeline wall thickness estimating means 32 shown in FIG. 10. Then, a comparison is made between the following two pressure propagation velocities. One is pressure propagation velocity estimated from the actual pressure reaction time lag between gauges 6a and 6b obtained from the pressure propagation velocity estimating means 23. Another is pressure propagation velocity obtained from the foregoing operation (1) by the pressure propagation velocity operating means. If there exists a large difference between the foregoing two pressure propagation velocities, the following matters are expected. Namely, the wall thickness of the distribution pipeline having a flow rate change in the distribution block becomes thin, or the inner wall of the pipeline rusts.

Thus, the pressure propagation velocity operating means sends distribution pipeline data having a flow rate change in the distribution block to at least mapping device 14-1 via display control means (equivalent to the pipeline wall thickness display control means 33).

The mapping device 14-1 receives the distribution pipeline data having a flow rate change in the distribution block. Then, the mapping device 14-1 displays a distribution pipeline network map in the vicinity of distribution pipeline data having a flow rate change in the distribution block on the mapping device 14-1 from the distribution pipeline network map database 14-2.

According to this embodiment, if there exists a large difference between the pressure propagation velocity estimated by the pressure propagation velocity estimating means 23 and that obtained from the equation (1), the following advantage is obtained. Namely, a distribution pipeline network map around the distribution pipeline having a flow rate change is displayed. This serves to grasp the following possibility whether or not the wall thickness of the distribution pipeline becomes thin, the inner portion of the pipeline rusts, and crack and breakage will occur in future.

In the water leakage position estimator 13, the flow rate change factor acquiring means 28 shown in FIG. 9 sends a signal related to crack and breakage to the flow rate change position estimating mean 24 when determining that the pipeline cracks or breaks. Then, the means 24 estimates the flow rate change position based on the pressure propagation velocity estimated by the pressure propagation velocity estimating means 23 and the locating position of the flow meter 5, pressure gauges 6a and 6b. Thereafter, the means 24 sends the estimated position to the monitoring server 12-1 and the mapping device 14-1 via the water leakage position display control means 26.

The flow rate change factor acquiring means 28 determines the operations of the equipments other than crack and breakage of the pipeline as flow rate change factors. In this case, the pipeline wall thickness estimating means 32 shown in FIG. 10 is used in place of the flow rate change position estimating means 24. The pipeline wall thickness estimating means 32 executes an operation of the foregoing equation (1) using the following data. One is pressure propagation velocity previously set sent from the pressure propagation velocity estimating means 23 based on a flow rate change. Another is Young's modulus and pipe bore received from the pipe bore operating means 31. Then, the means 32 executes the calculation of the equation (1) and estimates a wall thickness of the distribution pipeline having a flow rate change in the distribution block. Thereafter, the means 32 outputs the obtained pipeline wall thickness estimate to the monitoring server 12-1 and the mapping device 14-1 via the pipeline wall thickness display control means 33.

In other words, the flow rate change position estimating means 24 and the pipeline wall thickness estimating means 32 are independently used in accordance with a flow rate change factor. In this way, the flow rate change position or the wall thickness of the pipeline is estimated and output, and thereby, it is possible to display a state of pipelines and other equipments in accordance with a flow rate change factor.

Others, the present invention is not limited to the foregoing embodiments. Various changes may be made within the scope without departing the subject mater of the invention.

(1) According to the foregoing embodiments, the distribution pipeline network map is created using the distribution pipeline network map creator 14, and stored in the distribution pipeline network map database 14-2. For example, the following configuration may be given. Specifically, data related to the distribution pipeline network map created by the creator 14 may be stored in the water leakage position estimator 13. Then, the water leakage position estimator 13 uses the data related to the distribution pipeline network map when estimating a water leakage position, and displays it on a display unit in the estimator 13.

(2) According to the foregoing embodiments, one flow meter 5 and two pressure gauges 6a, 6b are located in each of the water distribution block 3a, 3b, . . . . For example, two flow meters 5 or more may be located, and further, one or three or more pressure gauges may be located.

What is claimed is:

1. A water leakage monitoring system provided with one or more flow meter and two or more pressure gauges in each water distribution block forming a water distribution pipeline network, and estimating a water leakage position from flow rate data and pressure data measured by these flow meter and pressure gauges, comprising:
a monitoring device receiving the flow rate data and the pressure data measured by the flow meter and the pressure gauges, and storing time-series flow rate and pressure data at a predetermined period for every water distribution block; and a water leakage position estimator estimating a water leakage position from the flow rate data and the pressure data stored in the monitoring device,
wherein the water leakage position estimator includes:
periodic data acquiring means for fetching predetermined-period flow rate data and pressure data at every water distribution block from the monitoring device, and fetching and outputting a signal related to a flow rate change expecting a water leakage from the predetermined-period flow rate data and to a pressure change resulting from the flow rate change from the predetermined-period pressure data related to at least two pressure gauges;
pressure gauge reaction time calculating means for calculating a pressure reaction time lag from a signal related to a change between two pressures output from the periodic data acquiring means;
pressure propagation velocity estimating means for estimating a pressure propagation velocity using the pressure reaction time lag obtained by the pressure gauge reaction time calculating means and a distance between pressure gauges obtained at two pressure gauge locating positions of each water distribution block previously stored in a water distribution pipeline network map;
pipe bore calculating means for fetching a bore of a pipe mutually connecting the pressure gauges of the water distribution block or connecting the flow meter and the pressure gauge from previously stored water distribution pipeline network map data when receiving a signal related to a flow rate change from the periodic data acquiring means, and calculating an average value of pipe bores when a connection is made using a pipeline having a pipe bore different from the fetched pipe bore; and
pipeline wall thickness estimating means for estimating and displaying a wall thickness of a pipeline having the flow rate change based on a predetermined pressure propagation velocity calculating equation using the pipe bore obtained by the pipe bore calculating means and the pressure propagation velocity.

2. The water leakage monitoring system according to claim 1, further comprising:
means for making a comparison between the pressure propagation velocity estimated by the pressure propagation estimating means and the pressure propagation velocity obtained from the predetermined propagation velocity calculating equation using a wall thickness and bore of the pipeline having a flow rate change obtained from the water distribution pipeline network map data, and for outputting and displaying the pipeline data having a flow rate change when a large difference exists between the foregoing two pressure propagation velocities.

3. A water leakage monitoring system provided with one or more flow meter and two or more pressure gauges in each of water distribution blocks forming a water distribution pipeline network, and estimating a water leakage position from flow rate data and pressure data measured by the flow meter and pressure gauges, comprising:
a monitoring device receiving flow rate data and pressure data measured by the flow meter and the pressure gauges located in each water distribution block forming the water distribution pipeline network, and storing periodically and successively the received flow rate data and pressure data in a time-series manner at each water distribution block; and a water leakage position estimation device estimating a water leakage position from the flow rate data and the pressure data stored in the monitoring device, wherein the water leakage position estimation device includes:

periodic data acquiring means for fetching periodically from the monitoring device the flow rate data and the pressure data at every water distribution block to output a signal relating to a flow rate change expecting a water leakage from the flow rate data and relating to the pressure changes caused by the flow rate change and denoted by at least two items of the pressure data obtained from the two pressure gauges;

pressure gauge reaction time calculating means for calculating from the signal a time difference between the two pressure changes obtained from at least two pressure gauges output from the periodic data acquiring means;

pressure propagation velocity estimating means for estimating a pressure propagation velocity using the time difference between the pressure gauge reaction times obtained by the pressure gauge reaction time calculating means and a distance between two pressure gauge locating positions in each water distribution block previously stored in a water distribution pipeline network map data; and flow rate change position estimating means for estimating and displaying a flow rate change position denoting a water leakage position using the pressure propagation velocity estimated by the pressure propagation velocity estimating means and flow meter and pressure gauge locating positions stored in the water distribution pipeline network map data when receiving the signal relating to the flow rate change from the periodic data acquiring means.

4. The water leakage monitoring system according to claim 3, further comprising:

storage means for storing data denoting at least a relation between flow rate change values and pipe bore diameters of pipelines in the pipeline network; and pipe bore diameter determining means by referring to the storage means based on a flow rate change value, when the signal relating to the flow rate change value obtained by the periodic data acquiring means is received, to determine a pipe bore diameter of a pipeline corresponding to the flow rate change value, thereby sending data denoting the determined pipe bore diameter to the flow rate change position estimating means so as to output and display the data together with flow rate change position data.

5. The water leakage monitoring system according to claim 4, further comprising:

storage means for storing data denoting at least a relation between the flow rate change values and various flow rate change factors including crack and breakage of a pipeline located in each of the water distribution block; and flow rate change factor acquiring means by referring to the storage means based on the flow rate change values, when the signal relating to the flow rate change is received from the periodic data acquiring means, for estimating and displaying the flow rate change factor data denoting that the flow rate change is caused by at least one of a crack or a breakage of the pipeline, use of a fire hydrant and an operation of a water receiving tank.

6. The water leakage monitoring system according to claim 2, wherein when the flow rate change factor acquiring means estimates that a flow rate change factor results from crack and breakage of a pipeline, the flow rate change position estimating means estimates and outputs a flow rate change position based on pressure propagation velocity obtained by the pressure propagation velocity estimating means, and when the flow rate change factor acquiring means estimates that the flow rate change factor results from an equipment other than crack and breakage of a pipeline, the configuration described in claim 3 estimates and displays a wall thickness of the pipeline having a flow rate change.

* * * * *